United States Patent [19]

Takata

[11] Patent Number: 5,291,965
[45] Date of Patent: Mar. 8, 1994

[54] ENGINE OUTPUT CONTROL SYSTEM FOR VEHICLE

[75] Inventor: Tetsuya Takata, Hiroshima, Japan

[73] Assignee: Mazda Motor Corporation, Hiroshima, Japan

[21] Appl. No.: 765,819

[22] Filed: Sep. 26, 1991

[30] Foreign Application Priority Data

Sep. 28, 1990 [JP] Japan .................... 2-262783

[51] Int. Cl.⁵ ............................................ B60K 31/00
[52] U.S. Cl. ............................ 180/197; 364/426.03
[58] Field of Search ........................ 180/197, 76; 364/426.03

[56] References Cited

U.S. PATENT DOCUMENTS

| | | |
|---|---|---|
| 4,682,667 | 7/1987 | Hosaka . |
| 4,959,794 | 9/1990 | Shiraishi et al. ............... 180/197 X |
| 5,000,280 | 3/1991 | Wazaki et al. . |
| 5,046,461 | 9/1991 | Kanehiro et al. . |
| 5,099,942 | 3/1992 | Kushi et al. .................... 180/197 |

FOREIGN PATENT DOCUMENTS 60-121129 6/1985 Japan .
0320007 6/1986 Japan .

*Primary Examiner*—Joseph D. Pape
*Attorney, Agent, or Firm*—Sixbey, Friedman, Leedom & Ferguson

[57] ABSTRACT

An engine output control system for a vehicle detects a degree of slip of driving wheels of the vehicle and determines engine output reduction requirement by which the output of the engine is to be reduced in order to converge the degree of the slip of the driving wheels on a target value according to the degree of slip detected. The output of the engine is reduced by the engine output reduction requirement when the engine speed is not lower than a preset engine speed and reduction of the engine output is inhibited when the engine speed is lower than the preset engine speed. The preset engine speed is changed according to the engine output reduction requirement so that the preset engine speed is higher when the engine output reduction requirement is large than when it is small.

6 Claims, 4 Drawing Sheets

ENGINE OUTPUT CONTROL SYSTEM FOR VEHICLE

BACKGROUND OF THE INVENTION

1. Field of the Invention

This invention relates to an engine output control system for a vehicle.

2. Description of the Prior Art

In a so-called traction control system, the engine output is reduced independent from the amount of depression of the accelerator pedal of a vehicle when the slip of the driving wheels of the vehicle reaches a predetermined value so that the slip of the driving wheels converges on a target value. However when the engine output is reduced at a low engine speed, the engine can stall.

In order to overcome such a problem, in a traction control system disclosed in Japanese Unexamined Patent Publication No. 60(1985)-121129, reduction of the engine output is inhibited when the engine speed is lower than a preset engine speed (e.g., 600 to 2000 rpm). That is, in the traction control system, slip of the driving wheels is detected on the basis of the difference between the wheel speed of the driving wheels and that of the driven wheels, and when the slip of the driving wheels thus detected reaches a predetermined value, fuel supply to one or more of the cylinders of the engine is cut to reduce the engine output so that the slip of the driving wheels converges on a target value. When the engine speed is lower than a preset engine speed, fuel cut is inhibited.

Though the traction control system is advantageous in that the engine is prevented from stalling since fuel cut is inhibited when the engine speed is low, it gives rise to the following problems due to the fact that the preset engine speed is fixed.

That is, when the engine output reduction requirement is large, for instance, to such an extent that fuel supply to all the cylinders is to be cut, the engine can stall since the preset engine speed is relatively low for the engine output reduction requirement and the engine output is abruptly lowered. On the other hand when the engine output reduction requirement is small, for instance, to such an extent that fuel supply to only one cylinder is to be cut every other intake stroke, the engine output cannot be sufficiently reduced though the engine is not apt to stall in such conditions since the preset engine speed is relatively high for the engine output reduction requirement.

SUMMARY OF THE INVENTION

In view of the foregoing observations and description, the primary object of the present invention is to provide an engine output control system for a vehicle in which the engine output can be satisfactorily reduced without fear of engine stall.

In accordance with the present invention, there is provided an engine output control system for a vehicle comprising a slip detecting means which detects a degree of slip of driving wheels of the vehicle, an engine output reduction determining means which determines engine output reduction requirement, by which the output of the engine is to be reduced, according to the degree of slip of the driving wheels detected by the slip detecting means, an engine output reducing means which reduces the output of the engine by the engine output reduction requirement determined by the engine output reduction determining means, an engine speed detecting means which detects the engine speed, and an engine output reduction inhibiting or limiting means which inhibits or limits reduction of the engine output when the engine speed is lower than a preset engine speed, preset engine speed changing means which changes the preset engine speed according to the engine output reduction requirement so that the preset engine speed is higher when the engine output reduction requirement is large than when it is small.

The engine output reducing means may be in various forms. For example, it may be a means for controlling fuel supply to the cylinders of the engine, a means for controlling the ignition timing or a means for controlling the amount of intake air. The engine output reduction inhibiting means may inhibit reduction of the engine output or may limit reduction of the engine output to a fraction (e.g., a half) of the engine output reduction requirement when the engine speed is lower than the preset engine speed.

DESCRIPTION OF THE PREFERRED EMBODIMENT

Figure 1:
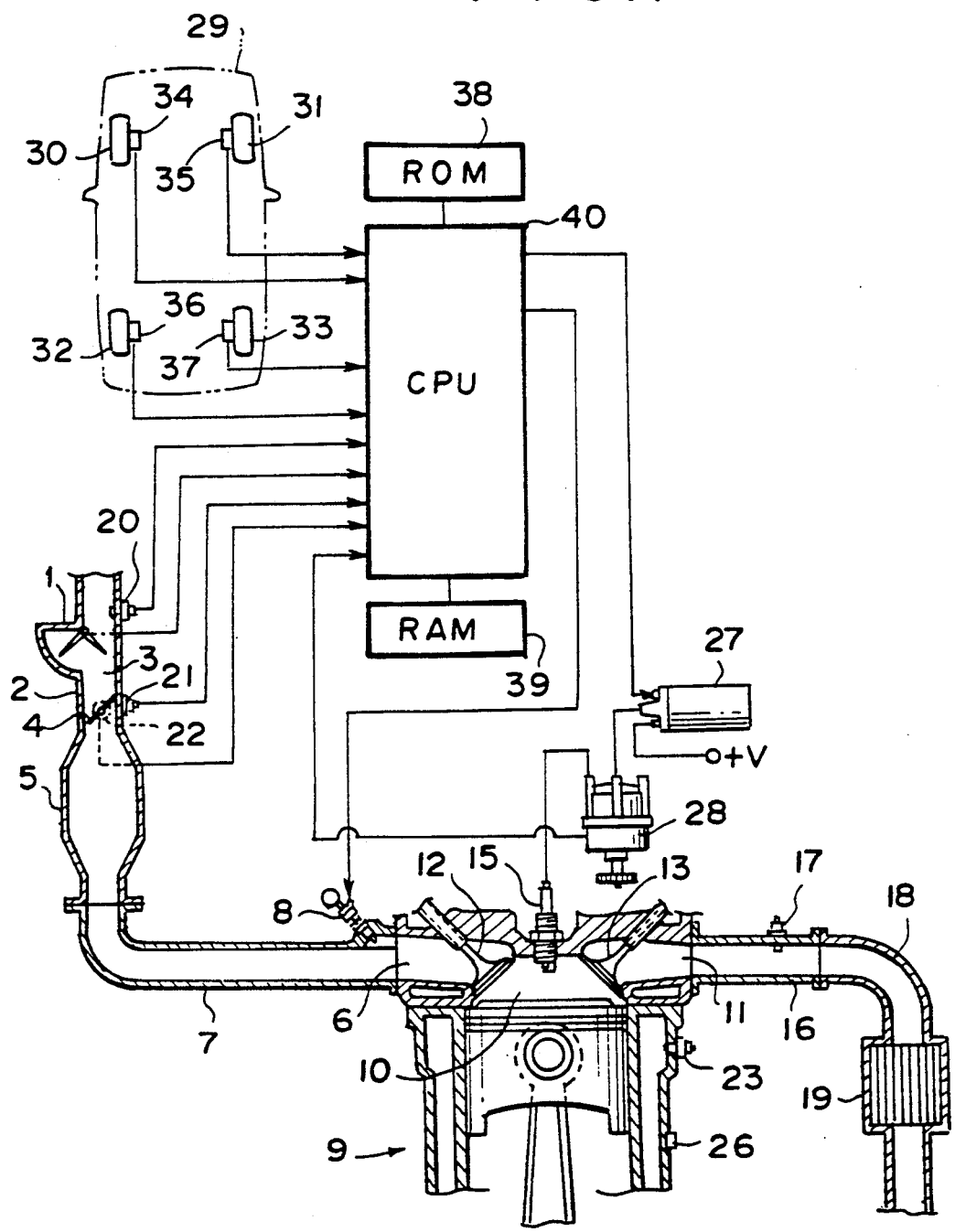
FIG. 1 is a schematic view showing a vehicle provided with an engine output control system in accordance with an embodiment of the present invention.

In FIG. 1, an engine 9 has six cylinders 10, number one cylinder to number 6 cylinder, though only one cylinder is seen therein. The engine 9 is provided with an airflow sensor 1, throttle body 2, a surge tank 5 and an intake manifold 7 which communicates an intake port 6 for each cylinder 10 with the surge tank 5. Fuel injectors 8 for each cylinder 10 are provided in the intake manifold 7. The throttle body 2 has a throttle chamber 3 therein and a throttle valve 4 is provided in the throttle chamber 3. An intake valve 12 is provided in each intake port 6. An exhaust port 11 for each cylinder 10 is communicated with a downstream side exhaust passage 18 by way of an exhaust manifold 16. An exhaust valve 13 is provided in each exhaust port 11, an $O_2$ sensor 17 is provided in the exhaust manifold 16, and a catalytic convertor 19 is provided in the downstream side exhaust passage 18.

Reference numeral 15 denotes a spark plug, reference numeral 20 denotes an intake air temperature sensor, reference numeral 21 denotes an idle sensor, reference numeral 22 denotes a throttle sensor, reference numeral 23 denotes an engine coolant sensor, reference numeral 26 denotes a knock sensor, reference numeral 27 denotes an ignitor coil, and reference numeral 28 denotes a distributor.

The engine 9 is mounted on a front-engine front-drive vehicle 29 which has left and right front wheels (driving wheels) 30 and 31 and left and right rear wheels 32 and 33 (driven wheels). The wheel speeds of the respective wheels 30 to 33 are detected by wheel speed sensors 34 to 37.

Figure 2:
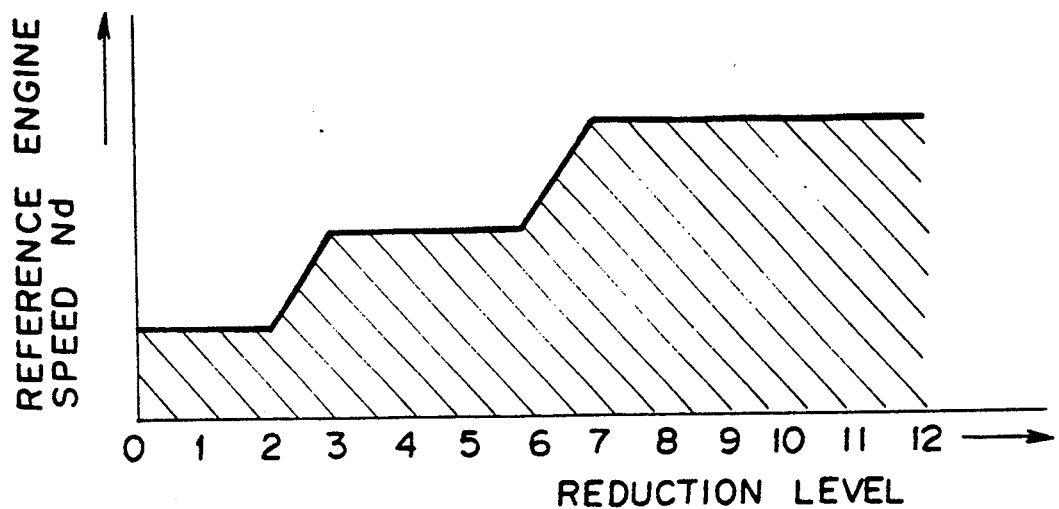
FIG. 2 is a view showing a map for determining the reference engine speed.

A CPU (central processor unit) 40 receives signals representing the wheel speeds of the respective wheels 30 to 33 from the wheel speed sensors 34 to 37, a signal representing the amount of intake air from the airflow sensor 1, an idle signal from the idle switch 21, a signal representing the throttle opening from the throttle sensor 22, and an engine speed signal and a crank angle signal from the distributor 28. The CPU 40 controls the ignitor coil 27, the spark plugs 15 and the fuel injectors 8 on the basis of those signals according to a program stored in a RAM 39. The RAM 39 stores required data such as maps shown in FIG. 2 and the following table. The map shown in FIG. 2 is for determining the aforesaid preset engine speed below which the engine output reduction inhibiting means should inhibit reduction of the engine output, and the map shown in the following table is for determining the manner of fuel cut for a given engine output reduction requirement.

TABLE

| reduction level | #1 | #2 | #3 | #4 | #5 | #6 |
|---|---|---|---|---|---|---|
| 1 | x | | | | | |
| 2 | | xx | | | | |
| 3 | | xx | x | | | |
| 4 | xx | xx | | | | |
| 5 | xx | xx | x | | | |
| 6 | xx | xx | | xx | | |
| 7 | xx | xx | | xx | x | |
| 8 | xx | xx | xx | xx | | |
| 9 | xx | xx | xx | xx | | x |
| 10 | xx | xx | xx | xx | xx | |
| 11 | xx | xx | xx | xx | xx | x |
| 12 | xx | xx | xx | xx | xx | xx |

In the above table, "x" indicates that fuel supply to the cylinder is to be cut every other intake stroke, and "xx" indicates that fuel supply to the cylinder is to be cut every intake stroke. For example, for the engine output reduction requirement level (abbreviated as "reduction level" in the table) 3, fuel supply to No. 2 cylinder is cut every intake stroke and that to No. 3 cylinder is cut every other intake stroke.

Figure 3:
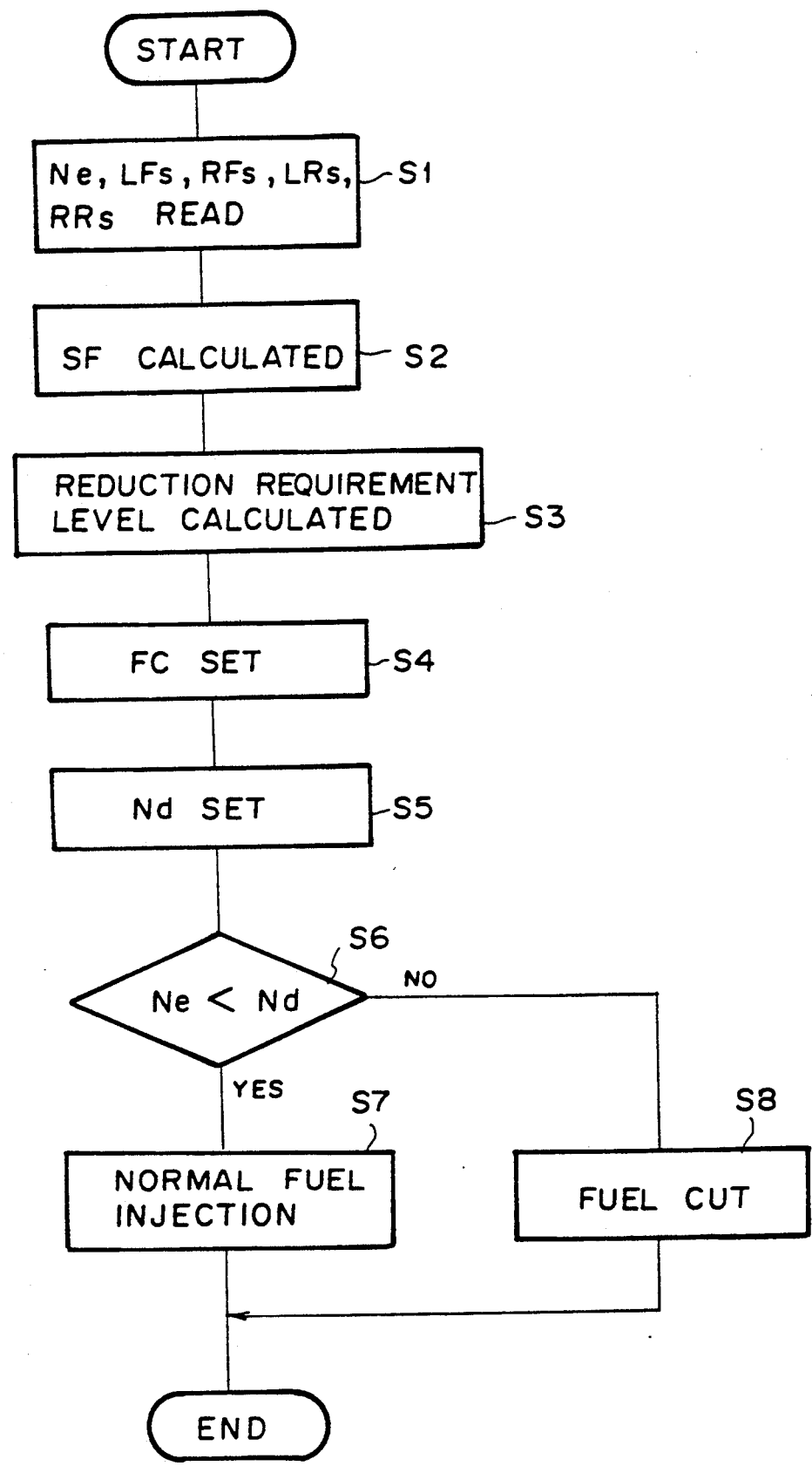
FIG. 3 is a flow chart showing the operation of the CPU in control of engine output.

The operation of the CPU 40 in control of engine output will be described with reference to the flow chart shown in FIG. 3, hereinbelow.

In step S1, the CPU 40 reads the engine speed Ne, and the wheel speeds LFs, RFs, LRs and RRs of the left front wheel 30, the right front wheel 31, the left rear wheel 32 and the right rear wheel 33. Then the CPU 40 calculates in step S2 the degree of slip SF of the driving wheels, i.e., the left and right front wheels 30 and 31, relative to the road surface on the basis of the wheel speeds of the driving wheels and the driven wheels. Though the degree of slip SF may be calculated according to various known formulae, the degree of slip of the driving wheels SF is calculated on the basis of formula $Ds-(LRs+RRs)/2$ in this particular embodiment, wherein Ds represents the larger of the wheel speeds LFs and LRs of the left and right front wheels 30 and 31. Then in step S3, the CPU 40 calculates the engine output reduction requirement by which the output of the engine is to be reduced in order to converge the degree of slip of the driving wheels SF on a target value according to the degree of slip SF of the driving wheels calculated in step S2 and determines the level of the engine output reduction requirement (level 1 to level 12). Thereafter the CPU 40 sets in step S4 the manner of fuel cut FC with reference to the map shown in the above table. IN step S5, the CPU 40 sets a reference engine speed on the basis of the level of the engine output reduction requirement with reference to the map shown in FIG. 2. As can be seen from FIG. 2, the reference engine speed Nd is set stepwise according to the level of the engine output reduction requirement so that it is the lowest for level 1 and level 2 and the highest for level 7 to level 12. When the actual engine speed Ne is lower than the reference engine speed Nd, the CPU 40 causes the fuel injectors 8 to perform the normal fuel injection, and when the former is not lower than the latter, the CPU 40 inhibits one or more of the fuel injectors from injecting fuel according to the manner of fuel cut FC set in step S4. (steps S6 to S8) That is, in this particular embodiment, reduction of the engine output is inhibited irrespective of the degree of slip SF of the driving wheels when the actual engine speed Ne is lower than the reference engine speed Nd.

As can be understood from the description above, the reference engine speed is set high when the engine output reduction requirement level is high in the embodiment described above, and is set low when the engine output reduction requirement level is low. Accordingly, the engine is prevented from stalling when the engine output reduction requirement level is high while the engine output can be sufficiently reduced when the engine output reduction requirement level is low.

Figure 4:
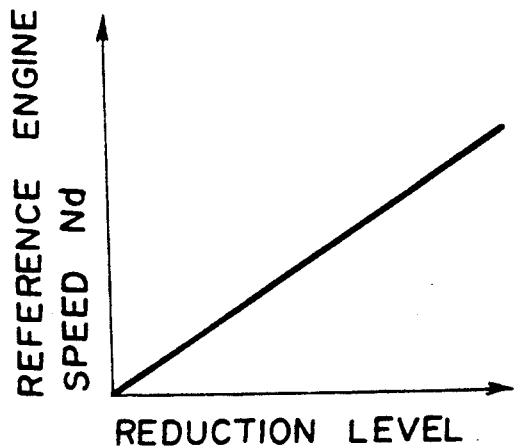
FIG. 4 is a view showing another map for determining the reference engine speed.
Figure 5:
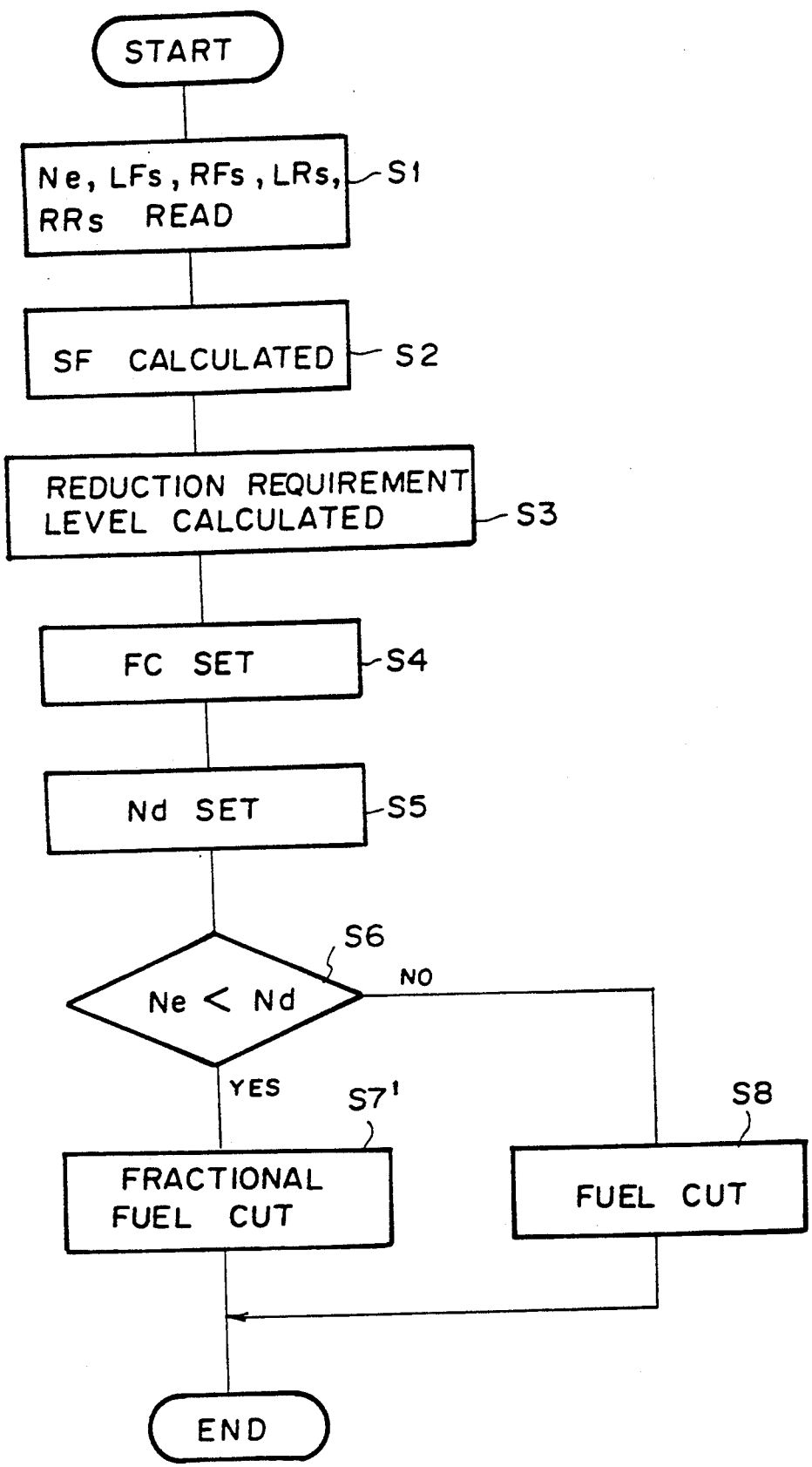
FIG. 5 is a flow chart showing a modification of the operation of the CPU in control of engine output.

Though, in the embodiment described above, the reference engine speed Nd is changed stepwise according to the level of the engine output reduction requirement, the reference engine speed Nd may be changed linearly with change in the level of the engine output reduction requirement as shown in FIG. 4. Further, though, in the embodiment described above, reduction of the engine output is inhibited irrespective of the degree of silp SF of the driving wheels when the actual engine speed Ne is lower than the reference engine speed Nd, reduction of the engine output may be limited to a fraction, e.g., 2/1, of the engine output reduction requirement as shown by step S7' in the flow chart shown in FIG. 5.

What is claimed is:

1. An engine output control system for a vehicle comprising a slip detecting means which detects a degree of slip driving wheels of the vehicle, an engine output reduction determining means which determines engine output reduction requirement by which the output of the engine is to be reduced in order to converge the degree of slip of the driving wheels on a target value according to the degree of slip of the driving wheels detected by the slip detecting means so that the engine output reduction requirement is larger when the slip is large than when the slip is small, an engine output reducing means which reduces the output of the engine by the engine output reduction requirement determined by the engine output reduction determining means so that the output of the engine is more reduced when the engine output reduction requirement is large than when the engine output reduction requirement is small, an engine speed detecting means which detects the engine speed, an engine output reduction inhibiting means which inhibits reduction of the engine output when the engine speed is lower than a preset engine speed, a preset engine speed changing means which changes the preset engine speed according to the engine output reduction requirement so that the preset engine speed is higher when the engine output reduction requirement is large than when the engine output reduction requirement is small.

2. An engine output control system as defined in claim 1 in which said preset engine speed is set stepwise according to the level of the engine output reduction requirement.

3. An engine output control system as defined in claim 1 in which said preset engine speed is linearly increased with increase in the engine output reduction requirement.

4. An engine output control system as defined in claim 1 in which said engine output reduction inhibiting means inhibits reduction of engine output to a fraction of the engine output reduction requirement when the engine speed is lower than the preset engine speed.

5. An engine output control system as defined in claim 1 in which said engine output reducing means reduces the output of the engine by cutting fuel supply to one or more of the cylinders of the engine.

6. An engine output control system for a vehicle comprising a slip detecting means which detects a degree of slip of driving wheels of the vehicle, an engine output reduction determining means which determines engine output reduction requirement by which the output of the engine is to be reduced in order to converge the degree of slip of the driving wheels on a target value according to the degree of slip of the driving wheels detected by the slip detecting means so that the engine output reduction requirement is larger when the slip is large that when the slip is small, an engine output reducing means which reduces the output of the engine by the engine output reduction requirement determined by the engine output reduction determining means so that the output of the engine is more reduced when the engine output reduction requirement is large than when the engine output reduction requirement is small, an engine speed detecting means which detects the engine speed, an engine output reduction limiting means which limits reduction of the engine output when the engine speed is lower than a preset engine speed, a preset engine speed changing means which changes the preset engine speed according to the engine output reduction requirement so that the preset engine speed is higher when the engine output reduction requirement is large than when the engine output reduction requirement is small.

* * * * *